May 13, 1958

L. HAMENT 2,834,466

LIQUID PURIFICATION APPARATUS

Filed May 2, 1955

INVENTOR
LOUIS HAMENT
BY
ATTORNEY

May 13, 1958            L. HAMENT            2,834,466
LIQUID PURIFICATION APPARATUS
Filed May 2, 1955            3 Sheets-Sheet 2
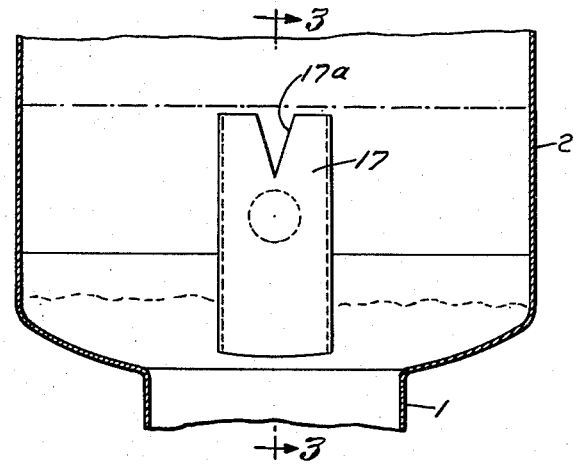
Fig. 2
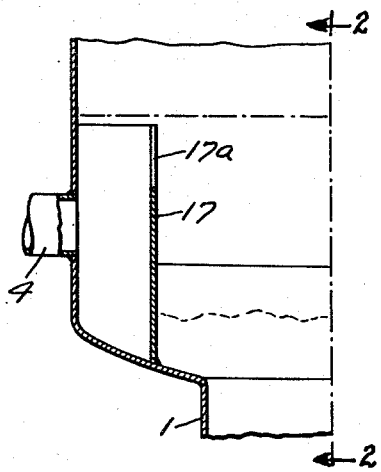
Fig. 3
Fig. 4
INVENTOR
LOUIS HAMENT
BY
ATTORNEY

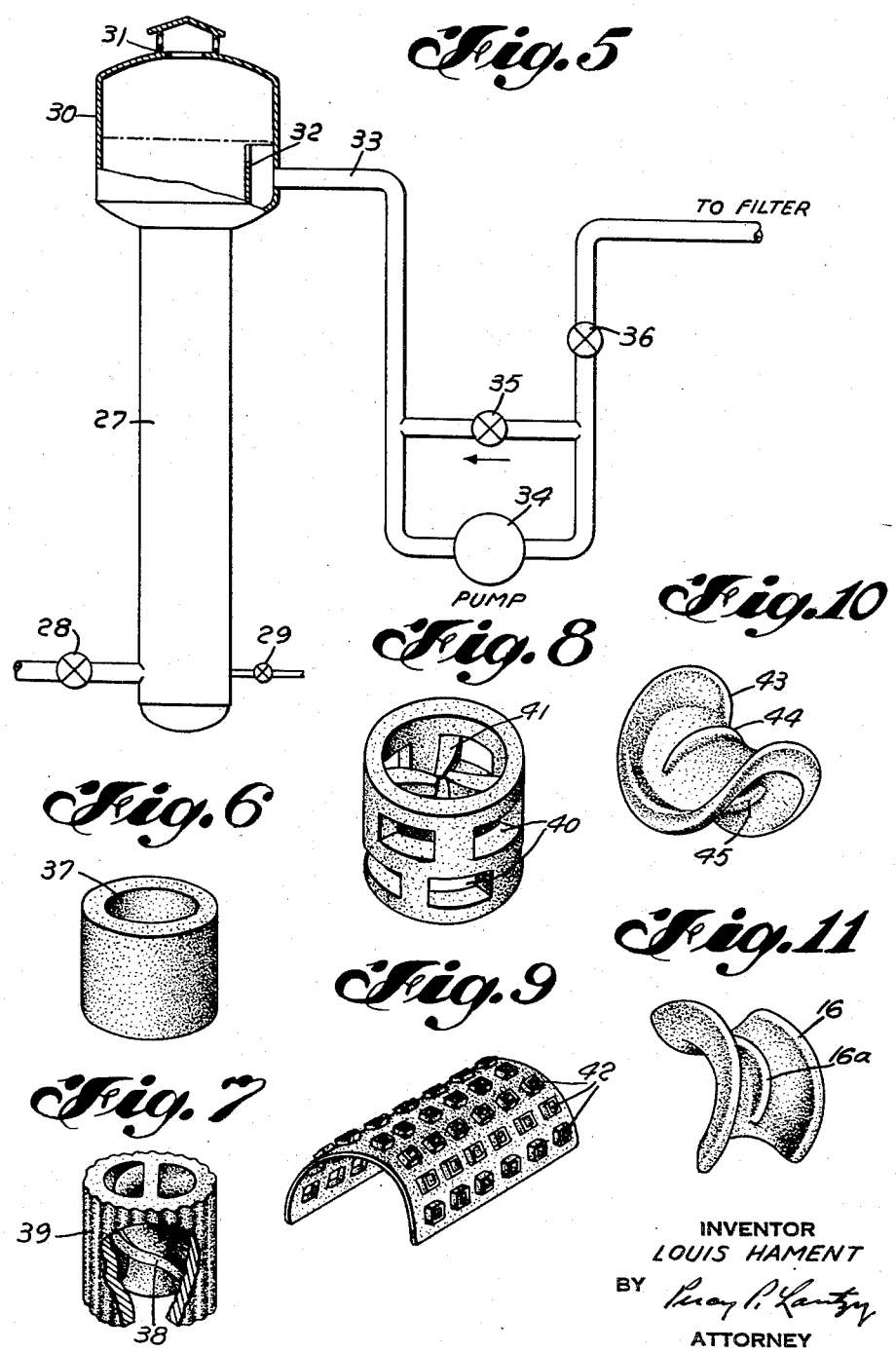

United States Patent Office 2,834,466
Patented May 13, 1958

2,834,466

LIQUID PURIFICATION APPARATUS

Louis Hament, Montville, N. J.

Application May 2, 1955, Serial No. 505,182

13 Claims. (Cl. 210—120)

This invention relates to liquid purification systems, and more particularly to an apparatus and method for purifying liquids containing oxidizable materials and objectionable gases.

Many sources of water in different localities contain in various amounts and proportions one or more undesired materials such as iron, manganese and organic substances, and sometimes objectionable gases such as carbon dioxide and hydrogen sulphide. If such water is not properly purified it may have an undesirable odor, taste or objectionable coloring and produce mineral and/or organic stains and deposits which are very objectionable not only for domestic use but also for industrial needs.

Many systems have been proposed heretofore for water purification including both the open and closed or pressure types. The open type has several disadvantages one of which is the costly pumping facilities required for either spraying the water in the open atmosphere or pumping air into a tank of water and then for placing the treated water, after settling or sedimentation, under a usable pressure. Other disadvantages of the open type are the large and expensive installations required for a complete system and the inefficient method of intermingling the water with air. Several difficulties have also been experienced with closed systems heretofore proposed. One of the main objections to the closed system is the difficulty of obtaining the thorough gas-liquid intermingling required for complete oxidation of the materials contained therein. Another objection is the use of excess air which in itself is a source of contaminants, particularly in industrial areas where the air contains dust, smoke and other gases. Another difficulty is the unsatisfactory disengagement and removal of gases from the liquid including that injected and those liberated during the treatment of the liquid.

In one of the closed systems heretofore proposed, a series of screens was provided crosswise of a vertically disposed pipe for the purpose of dividing at each screen the body of water and air introduced at the bottom of the pipe into series of multiple streams. This system of air and water intermingling, however, has not proved satisfactory because of the surface tension of the air bubbles which resists passage through the small openings in the screens resulting in the air tending to collect to one side or the other of the pipe and thereby "channel" about and bypass the main area of the screens. This usually results in a large stream of air along one side of the pipe and very little actual diffusion is obtained. Also the screens have a tendency to clog up within a short time with iron and other mineral deposits and thereby defeat their intended purpose. Still another difficulty of such prior systems is their failure to properly remove the air and liberated gases after the air-water mixing phase, the presence of such gases being very objectionable, particularly hydrogen sulphide and carbon dioxide which are highly corrosive agents.

It is an object of this invention therefore to provide improved water purification systems of the open or closed types which overcome or greatly reduce the aforementioned disadvantages and difficulties of prior systems.

Another object is to provide for use in either open or closed types of water purification systems a method and/or means of intermingling air or other oxidizing gas with the water so as to thoroughly oxidize the oxidizable material contained therein without using excess quantities of air or gas.

Another object of the invention is to provide an apparatus and method for effecting removal from water or other liquids of substantially all of the iron and other oxidizable materials and objectionable gases contained therein.

Another object is to provide an improved gas-liquid intermingling apparatus and means controlling the ratio of the oxidizing gas and liquid quantities introduced to effect complete oxidation of the oxidizable material contained in the liquid without introducing any more oxidizing gas than required for complete oxidization.

Still another object of the invention is to provide an improved gas and liquid disengaging apparatus and method whereby substantially all of the gases present in the liquid, including those injected and those liberated, are disengaged and removed from the liquid.

One of the important features of the invention is the apparatus provided for obtaining thorough intermingling of an oxidizing gas and the liquid to be treated. The gas-liquid intermingling column comprises an upright chamber containing a homogeneous random arrangement of packing elements each shaped to provide in the homogeneous mass a multiplicity of small tortuous interconnected passages extending in all directions upwardly through the chamber. The liquid and gas are introduced at the bottom of the chamber and the multiplicity of the tortuous passages successively divide and subdivide the liquid and gas thereby producing numerous thin turbulent streams saturated with minute bubbles of gas for intimate scrubbing and interface engagement as the saturated streams pass over and about the surfaces of the packing elements. This insures thorough oxidation of all the oxidizable material in the liquid. Means are provided to so control the ratio of the gas and liquid introduced that only sufficient air or other oxidizing gas is introduced to completely oxidize the oxidizable material carried in the liquid.

Another important feature of the invention is the gas and liquid disengaging chamber and its controls of the closed system. This chamber is larger in cross section than the gas-liquid intermingling chamber and is located in communication with the upper portion of the intermingling chamber. The enlarged cross-sectional area of the upper chamber decreases greatly the rate of flow of the liquid up through the packing elements to thereby enhance gas disengagement. A float control is provided to maintain a given liquid level within the chamber and to vent gases therefrom. To further insure disengagement of gases a partition and weir structure is provided to direct the liquid flow adjacent the upper surface of the liquid before it leaves the chamber and to effect removal of the liquid without turbulence. When the system is open the partition-weir arrangement is also utilized to avoid turbulence at the liquid exit so as to avoid re-entraining the liberated gas.

The above and other objects and features will be best understood upon reference to the accompanying detailed description and drawings, in which:

Fig. 2 is a fragmentary view in vertical section of the chambers taken along line 2—2 of Fig. 3;

Fig. 3 is a view in cross section taken along line 3—3 of Fig. 2 and

Fig. 4 is a view in elevation of a portion of the homogeneous mass of packing elements.

Fig. 5 is a view in elevation with parts broken away of an open system according to the principles of the invention; and Figs. 6 to 11 show various shapes of packing elements which may be used in the liquid-gas intermingling chamber.

Figure 1:
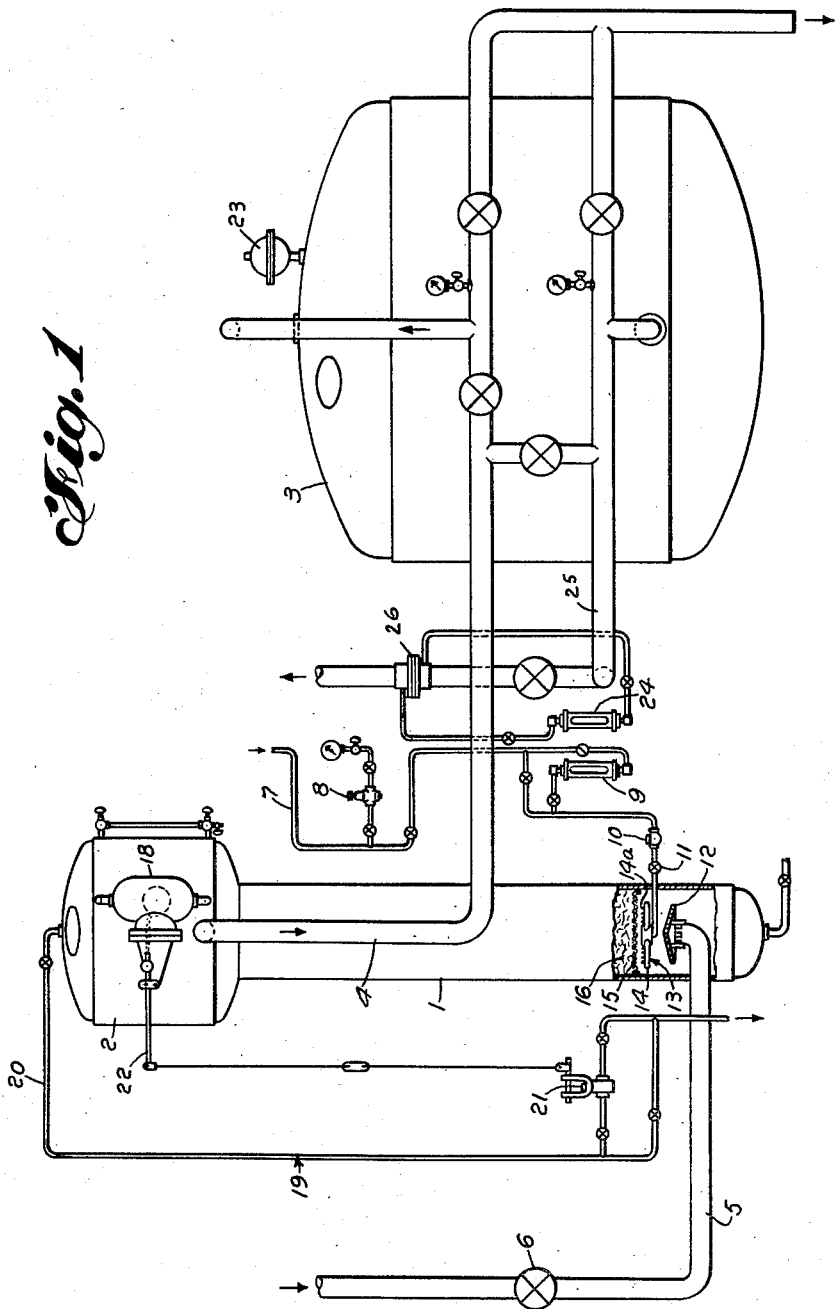
Fig. 1 is a view in side elevation of a closed system in accordance with the principles of this invention.

While the apparatus of this invention may be used for treating and purifying liquids of many different sources and containing different forms of impurities, I have chosen to describe it in connection with purification of water containing iron, other oxidizable materials and objectionable gases. Referring to the drawings, the gas-liquid intermingling chamber 1 comprises a vertically disposed tank of uniform diameter opening into a larger tank 2 of about twice the diameter. The tank 2 functions as a gas and liquid disengaging chamber. A filter 3 is connected by means of the water pipe 4 to the bottom portion of the tank 2 through which the water is passed to remove solid particles such as oxidized iron.

Raw water to be treated is introduced into the lower part of tank 1 through pipe 5 which is controlled by valve 6. Air or other oxidizing gas is fed under pressure from a source not shown through pipe 7, pressure regulator 8, flow meter 9, check valve 10 and needle valve 11 to the bottom portion of tank 1. In small capacity installations the raw water and air pipes open directly into the interior of tank 1. For larger installations it is preferable to introduce the raw water through a spreader device axially of the tank as illustrated at 12. The air pipe is connected to a manifold 13 which is provided with two or more nozzles 14, 14a distributed at spaced points in a plane crosswise of the tank. The water and air are introduced in this manner below a grille 15 onto which is interlockably and randomly disposed a homogeneous mass of packing elements each shaped to provide when assembled, a multiplicity of small tortuous interconnected passages extending in all directions upwardly through the tank.

While the packing elements may be of various shapes such as rings of varied specifications I have found a saddle shape to be especially satisfactory. Of the "Berl" and "Intalox" saddles, I find the "Intalox" manufactured by the United States Stoneware Co. to be preferred since the interlocking characteristic thereof adds stability to the column, resists side thrusts and has no tendency to pattern pack and provide channels directly upward through the mass. The shape of the "Intalox" saddles shown in Figs. 4 and 11 insures the establishment of numerous small interconnected passages in every which way in which the air and water are divided and subdivided over and over successively into intimate interface scrubbing contact. The water flows turbulently in very thin streams over and about the surfaces of the saddles where it is repeatedly divided and scrubbed by numerous minute air bubbles thus insuring thorough oxidation of the oxidizable materials carried in the water whether in solution or in suspension. The small ribs 16a and 16b on both sides of the saddles prevents the adjacent surfaces of any two saddles from blocking each other over any appreciable portion of the surface thereof. These ribs and the saddle shape insures a randomness of the mass and while interlocking for stability the elements also provide multiple channels and small pockets all through the mass of elements. The tank is loaded by first filling the tank with water and then allowing the saddles to gravitate down from the top, thus forming a random homogeneous column without any semblance of pattern stacking. This results in a mass having high voidage with an exceptionally high surface area per unit volume and one which has excellent lateral distribution qualities for dividing and re-dividing repeatedly the water and air fed into the bottom of the tank. This random arrangement of saddles provides for sufficient free space and voidage upwardly through the homogeneous mass that very little pressure drop is caused by the saddles.

The packing elements are preferably of ceramic or porcelain material, but may be of other material such as carbon, stainless steel or other metal alloys. I have found the ceramic elements exceptionally good for this purpose, especially since they are durable and easily cleaned. The Intalox saddles are particularly well suited for this use since they present low pressure drop and can be used for long periods of operation without frequent shutdowns for cleaning purposes. Where steel or other metal packing is used, and particularly when the packing comprises iron or steel fluffy curled turnings, a more frequent cleaning is required and the turnings must be replaced from time to time because they tend, after a period of use, to pack, clog and form undesired channels.

A partition 17 in tank 2 has a weir 17a through which the water flows to reach the outlet pipe 4. While water also flows over the upper edge of the partition 17, the weir 17a insures an even flow without turbulence. This avoids reintroduction of released gases. Connected to the upper and lower portion of tank 2 is a float chamber 18 having a float therein to control a connection vent 19 which includes a pipe 20 connected to the upper end of tank 2 and a lever actuated valve 21, the actuating lever of which is connected to a lever 22 controlled by the float. The valve 21 and its float connection are adjusted to maintain the water in tank 2 at a given level preferably above the partition 17. As the float drops with the lowering of the water level connections are actuated to increase the opening of the vent valve 21. This increased expulsion of air and other gas from the tank 2 reduces the gas pressure and reestablishes the desired liquid level. This venting arrangement avoids the building up of excess pressure within tank 2 and at the same time maintains the liquid level for proper flow through the weir 17a and over partition 17 thereby insuring satisfactory disengagement of the gases from the liquid without re-entraining part of the liberated gases as the liquid leaves the tank. The enlarged capacity of the tank 2 with respect to the capacity of the saddle-filled tank 1 further insures substantially complete disengagement of the gases from the liquid due to the greatly decreased rate of liquid flow as the liquid enters the tank 2. The partition 17 causes the gas laden liquid to be brought to the surface of the liquid level thus also enhancing gas disengagement. The filter 3 is provided with the usual gas vent 23 to release any gases that may be disengaged from the liquid during the filtering.

To establish the proper ratio of air injection to the rate of flow of raw water, the raw water is first analyzed to determine the amount of oxidizable material it contains. Once this is determined the proper ratio can be calculated and the needle valve then adjusted until the air flow meter 9 indicates the ratio desired. The rate of flow of water through the system is determined by the flow meter 24 connected in the pipe 25 which carries the effluent from the bottom of the filter 3, the meter being connected on opposite sides of the orifice plate 26. This controlled ratio of air and water minimizes the amount of contamination that can be obtained from the air, such as is present in the atmosphere of industrial areas. In open systems heretofore proposed, where air in large uncontrolled quantities is used, additional problems are presented by the contamination from the air itself.

In one installation of this system the raw water had a muddy appearance and contained iron in the order of 40 parts per million. After treatment in accordance with this invention the water was clear as crystal and the iron content was found to be between 0.0 and 0.1 part per million. The pressure of the raw water introduced into tank 1 was about 40 pounds per square inch while the air was regulated at about 65 pounds per square inch. The pressure drop through the tanks 1 and 2 corresponded directly with the hydraulic head only of the water height from the bottom of tank 1 to the water level in tank 2. The head loss due to the packing was negligible. Thus, the column of saddles presents no pressure drop problem in this invention.

The filter 3 is provided with the necessary connections and valves for periodic backwashing. During the backwashing operation a suitable iron removing compound is introduced into the water flowing through tanks 1 and 2. This maintains the tanks and the mass of ceramic elements clean thus avoiding any tendency toward clogging.

If the effluent is to be delivered to an open settling or sedimentation tank, that is, one having direct communication with the atmosphere, the gas disengaging chamber may be dispensed with. In such an open system the water and air is introduced into the bottom of the intermingling chamber similarly as described in connection with the closed system of Fig. 1. The intimate intermingling and scrubbing action oxidizes the oxidizable materials and liberates gases in the same manner, part of the resulting solids being separated in the settling tank where air and gas bubbles are allowed to pass to the atmosphere while the remainder is removed by filtering.

The closed system of Fig. 1 could also be easily modified for open operation and the effluent passed through to a settling tank or even through a pressure filter. Such an open system is shown in Fig. 5 wherein the column 27 contains a homogeneous mass of packing elements such as rings or saddles as described in connection with Fig. 1. The water and air are introduced through valves 28 and 29 respectively and after repeated subdivision and intimately scrubbing upwardly through the packing elements the air and gases are liberated to the atmosphere in the larger tank 30 which is open at 31. The liquid flows over the weir contained partition 32 and output pipe 33. While Fig. 5 shows the tank 30 larger than the tank 27 it need not be any larger, and in fact may be the same size as tank 27 whether or not the system is of the open or closed type. To place the effluent under pressure and to adjust for proper rate of flow through the filter, a pump 34 is provided with a bypass connection controlled by a valve 35. The output to the filter is also controlled by a valve 36. By regulating valves 35 and 36 and the input valve 28 a controlled flow is obtained through both the intermingling chamber and the filter.

Where a sedimentation or settling tank is required the effluent from the aerator 30 is fed directly into the sedimentation or settling tank from which it may be pumped through the filter. It will be recognized by those skilled in the art that the intermingling chamber 27 is applicable for use in either an open or closed system and the open aerator may be used with or without sedimentation, as may be desired.

The ceramic elements used in the system may be selected from a large variety of packing elements. Figs. 6–11 show a few examples. In Fig. 6 the simplest form of Raschig ring is shown. The passage 37 through the center of the ring may be varied in shape such as by providing the inner surface with a helical rib, or the passage may be subdivided with one or more partitions. In Fig. 7 a ring is shown with a spiral partition 38 and a grooved outer surface 39. Still other forms may have openings in the side walls as shown at 40 and inwardly disposed spider-like partition 41, Fig. 8. The semi-ring of Fig. 9 which may be ceramic or metal is also satisfactory, the wall of this element being provided with openings at 42 the sides of which protrude from the wall surface thereof.

Figs. 10 and 11 show Berl and Intalox saddles respectively. The Berl saddle 43 is shaped like a riding saddle but has ribs 44 and 45 on opposite sides to prevent undesired stacking. The Intalox saddle is semi-tubular and curved lengthwise. It too has one or more ribs 16a and 16b (see also Fig. 4) to avoid undesired stacking.

It should be clearly understood that any one of the packing elements (Figs. 6 to 11) or any combination thereof desired, may be used in the intermingling chamber. Where a combination of packing elements is used, it is preferable to have one section filled with Intalox saddles only.

While the apparatus and method of liquid purification has been described in connection with water purification it will be readily understood that the apparatus and method may be used for purifying many different types of liquid and for many different impurities including numerous types of gases. The system may be used for removing oxidizable materials other than iron, manganese and various compounds. For example, it functions exceptionally well for oxidation of organic material and for removing objectionable gases dissolved in the water, such as hydrogen sulfide, methane and carbon dioxide. The efficiency of gas removal is particularly important where carbon dioxide is involved since carbon dioxide corrodes metal pipes and tanks. This removal is assured by the enlarged tank 2, the partition 17 and the float controlled vent valve 21. Where the problem of gas disengagement is less important the tank 2 may comprise a continuation of tank 1 in so far as size is concerned.

While I have described the principles of my invention in connection with specific apparatus, it is to be clearly understood that this description is made by way of example only and not as a limitation to the scope of my invention as set forth in the objects thereof and in the accompanying claims.

I claim:

1. In apparatus for treating liquid to remove therefrom oxidizable materials carried in solution and/or in suspension, a generally vertically disposed gas-liquid intermingling chamber, a plurality of elements loosely disposed in random manner as a packing in said chamber, each element being shaped to provide in conjunction with the other elements a multiplicity of small tortuous interconnected passages extending in numerous directions upwardly through said chamber and a large total area of liquid and gas scrubbing surfaces defining said passages, means for introducing liquid to be treated into the bottom portion of said chamber and forcing it upwardly through said packing, means to introduce an oxidizing gas into said liquid for concurrent flow upwardly in intimate and thorough diffusion with the liquid as the liquid and gas pass upwardly through the tortuous passages formed by said randomly disposed elements to oxidize the oxidizable material carried by said liquid and means separating gas from the treated liquid including a continuation of the upper portion of said gas-liquid intermingling chamber to function as a gas disengaging chamber, means to maintain an upper liquid surface level in said gas disengaging chamber, and means under control of said surface level maintaining means to vent gases from said disengaging chamber.

2. In apparatus for treating liquid to remove therefrom oxidizable materials carried in solution and/or solid particles carried in suspension, a gas-liquid intermingling chamber, a stack of randomly disposed elements in said chamber, each element being shaped to provide in conjunction with the other elements a multiplicity of small tortuous passages upwardly through said chamber, means for introducing liquid to be treated into the bottom portion of said chamber, means to introduce an oxidizing gas into said liquid for intimate and thorough diffusion with the liquid as the liquid and gas pass concurrently upwardly through the tortuous passages formed by said stack of elements to oxidize material carried in solution and/or in suspension, and a gas disengaging chamber of a cross-sectional area greater than the cross-sectional area of said intermingling chamber disposed in communication with the upper portion of said intermingling chamber, the cross-sectional capacity of said disengaging chamber being several times greater than the net cross-sectional flow area of said stack of elements to slow up the flow of liquid as it flows into said disengaging chamber thereby enhancing gas disengagement from said liquid, means including a vent valve to maintain a liquid surface level in said disengaging chamber and to vent gases from the upper portion of said disengaging chamber.

3. Apparatus for treating liquid to remove therefrom oxidizable material carried in solution and/or in suspension, comprising an elongated generally vertically disposed chamber, a multiplicity of saddle-shaped elements randomly disposed and filling a substantial portion of said chamber to provide a multiplicity of small tortuous interconnected passages upwardly through said chamber, means for forcing liquid into the bottom portion of said chamber, means to introduce an oxidizing gas into the stream of liquid for intimate and thorough diffusion with the liquid as the liquid and gas mixture is forced upwardly through said randomly disposed elements and in intimate scrubbing relation with the surfaces of said elements, means to control the flow of said liquid, means to control flow of gas whereby a desired flow ratio is obtained, a gas disengaging chamber communicating with the upper end of said elongated chamber, an outlet connection for flow of liquid from said gas disengaging chamber, a partition having a weir over which the liquid must flow to reach said outlet connection and means to maintain a liquid surface level above the lowest overflow portion of said partition.

4. Apparatus according to claim 3 wherein the means for maintaining said liquid surface level includes, a pump to pump under pressure the liquid from said gas disengaging chamber, a feed back connection between the output and input of said pump and means to control the flow of liquid through said feed back connection.

5. In apparatus for treating liquid while under a predetermined pressure at least greater than atmospheric to remove therefrom oxidizable materials carried in solution and/or in suspension, a generally vertically disposed intermingling chamber, a plurality of packing elements loosely disposed in random manner substantially filling said chamber, each element being shaped to provide in conjunction with the other element a multiplicity of small tortuous interconnected passages extending in numerous directions upwardly through said chamber and an exceptionally large total area of scrubbing surfaces defining said passages, means for introducing liquid under pressure into the bottom portion of said chamber and forcing it upwardly through said passages, means to introduce an oxidizing gas into said liquid for concurrent flow upwardly through said packing elements, said liquid and gas being forced together in intimate and thorough diffusion upwardly through said passages, the forced intimate diffusion of said liquid and gas operating to oxidize substantially all the oxidizable material carried by said liquid, and means for thereafter separating gas from the treated liquid while maintaining the liquid under a pressure at least greater than atmospheric, said last named means including a continuation of the upper portion of said intermingling chamber, means to maintain an upper liquid surface level in said disengaging chamber, and means under control of said surface level maintaining means to vent gases only when the pressure on the top of said surface level exceeds said predetermined pressure.

6. In liquid treating apparatus, a relatively long generally vertically disposed intermingling chamber, a homogeneous random arrangement of elements filling a major portion of said chamber, each element being shaped to provide in conjunction with other elements a multiplicity of small tortuous interconnected passages extending in numerous directions upwardly through said chamber, means to maintain a body of liquid in said chamber completely immersing said elements providing a pressure head, means for introducing liquid to be treated under pressure into the bottom portion of said chamber against the pressure head of said body of liquid, means for injecting a liquid treating agent into said liquid, said pressure and said pressure head coacting in conjunction with the multiplicity of surfaces presented by said elements to compress and to forcefully scrub together in intimate interface relation the particles of said liquid and said liquid treating agent as they flow concurrently upwardly through said chamber, thereby subjecting substantially all particles of said liquid to the treating action of said liquid treating agent.

7. Liquid treating apparatus according to claim 6 wherein said elements comprise ceramic bodies of a predetermined saddle-like shape to provide said passages and scrubbing surfaces regardless of the manner in which said elements are placed in said chamber, the surfaces of said ceramic bodies being curved in various directions to present numerous small curved scrubbing surfaces with a minimum of pressure drop, said curved surfaces being substantially self cleaning since the contacting portions of adjacent elements present a minimum of obstruction.

8. Liquid treating apparatus according to claim 6 further including a gas disengaging chamber having outlets for liquid and gas, means communicating the upper portion of said intermingling chamber with said gas disengaging chamber, means to maintain an upper surface level in said gas disengaging chamber, and means under control of said surface level maintaining means to control one of the outlets of said gas disengaging chamber.

9. In combination, a vertically disposed intermingling chamber, a grill disposed crosswise of said chamber in the bottom portion thereof, a homogeneous randomly disposed mass of elements supported by said grill and filling a major portion of said chamber, each element having numerous curved surfaces to provide in conjunction with other elements a multiplicity of small tortuous interconnected passages extending upwardly through said chamber, means to maintain a body of liquid in said chamber completely immersing said elements to provide a pressure head, means for introducing a liquid to be treated under pressure into said chamber below said grill against the pressure head of said body of liquid, means for introducing a liquid treating agent into said liquid, said pressure and said pressure head coacting in conjunction with the numerous curved surfaces of said elements to compress and to forcefully scrub together in intimate interface relation the particles of said liquid and said liquid treating agent as they flow concurrently upwardly through said chamber.

10. In apparatus for treating liquid to remove therefrom oxidizable materials carried in solution and/or in suspension, a relatively long generally vertically disposed intermingling chamber, a plurality of elements loosely disposed in random manner filling a major portion of said chamber, each element being shaped to provide in conjunction with the other elements a multiplicity of small interconnected passages extending in numerous directions upwardly through said chamber and a large total area of scrubbing surfaces, means to maintain a body of liquid in said chamber completely immersing said elements to provide a pressure head, means for introducing liquid to be treated into the bottom portion of said chamber and forcing it upwardly through said chamber against the pressure head of said body of liquid, means to introduce an oxidizing agent into said liquid, the forcing of said liquid upwardly against said pressure head coacting in conjunction with the scrubbing surfaces of said elements to compress and forcefully scrub together in intimate interface relation the particles of said liquid and said oxidizing agent as they flow concurrently upwardly through said chamber to oxidize the oxidizable material carried by said liquid and the means for maintaining said body of liquid including means for removing gas liberated from said liquid.

11. In apparatus for treating liquid while under a predetermined pressure to oxidize the oxidizable materials carried thereby, a generally vertically disposed intermingling chamber, a plurality of elements loosely disposed in random manner substantially filling said chamber, each element being shaped to provide in conjunction with the other elements a multiplicity of small interconnected passages extending in numerous directions upwardly through said chamber and an exceptionally large total area of scrubbing surfaces defining said passages, means to maintain a body of liquid in said chamber completely immersing said packing element to provide a pressure head, means for introducing liquid under pressure into the bottom portion of said chamber and forcing it upwardly through said passages against the pressure head imposed by said body of liquid, means to introduce an oxidizing agent into said liquid, said pressure and said pressure head coacting in conjunction with the scrubbing surfaces of said elements to compress and to forcefully scrub together in intimate and interface relation the particles of said liquid and said oxidizing agent as they flow concurrently upwardly through said passages, the forced intimate diffusion of said liquid and fluid about the surfaces of said packing elements operating to oxidize substantially all of the oxidizable material carried by said liquid, and means for thereafter removing gas from the treated liquid.

12. In apparatus for treating liquid to remove therefrom oxidizable materials carried in solution and/or in suspension, a generally vertically disposed intermingling chamber, a plurality of elements loosely disposed in random manner as a packing in said chamber, each element being shaped to provide in conjunction with the other elements a multiplicity of small tortuous interconnected passages extending in numerous directions upwardly through said chamber and a large total area of scrubbing surfaces defining said passages, means for introducing liquid to be treated into the bottom portion of said chamber and forcing it upwardly through said packing, means to introduce an oxidizing agent into said liquid for concurrent flow upwardly in intimate and thorough diffusion with the liquid as the liquid and said agent pass upwardly through the tortuous passages formed by said randomly disposed elements to oxidize the oxidizable material carried by said liquid and means for separating gas liberated from said liquid including a continuation of the upper portion of said intermingling chamber to function as a gas disengaging chamber, means to maintain an upper liquid surface level in said gas disengaging chamber, and means under control of said surface level maintaining means to remove gases from said disengaging chamber.

13. Apparatus for treating liquid, comprising an elongated generally vertically disposed chamber, a multiplicity of saddle-shaped elements randomly disposed and filling a substantial portion of said chamber to provide a multiplicity of small tortuous interconnected passages upwardly through said chamber, means for forcing liquid into the bottom portion of said chamber, means to introduce liquid treating agent into the stream of liquid for intimate and thorough diffusion with the liquid as the liquid and agent mixture is forced upwardly through said randomly disposed elements and in intimate scrubbing relation with the surfaces of said elements, means to control the flow of said liquid, means to control the flow of said liquid treating agent whereby a desired flow ratio is obtained, a gas disengaging chamber communicating with the upper end of said elongated chamber, an outlet connection for flow of liquid from said gas disengaging chamber, a partition having a weir over which the liquid must flow to reach said outlet connection and means to maintain a liquid surface level above the lowest overflow portion of said partition.

References Cited in the file of this patent

UNITED STATES PATENTS

| | | |
|---|---|---|
| 1,047,534 | Joseph | Dec. 17, 1912 |
| 1,138,202 | Erlwein et al. | May 4, 1915 |
| 1,590,120 | Perry | June 22, 1926 |
| 1,654,261 | Jones | Dec. 27, 1927 |
| 1,790,911 | Gibson | Feb. 3, 1931 |
| 2,048,158 | Goodwin | July 21, 1936 |
| 2,198,861 | Chamberlain et al. | Apr. 30, 1940 |
| 2,200,580 | Pruss et al. | May 14, 1940 |
| 2,237,882 | Lawlor et al. | Apr. 8, 1941 |
| 2,276,560 | Bird | Mar. 17, 1942 |
| 2,352,901 | Klein | July 4, 1944 |
| 2,370,772 | Bowers | Mar. 6, 1945 |
| 2,543,813 | Stover | Mar. 6, 1951 |
| 2,591,497 | Berl | Apr. 1, 1952 |
| 2,602,651 | Cannon | July 8, 1952 |
| 2,632,733 | Sherwood | Mar. 24, 1953 |
| 2,639,909 | Leva | May 26, 1953 |

FOREIGN PATENTS

| | | |
|---|---|---|
| 550 | Great Britain | Jan. 9, 1900 |
| 458,874 | Germany | Apr. 20, 1928 |
| 917,363 | Germany | July 8, 1949 |
| 711,684 | Great Britain | July 7, 1954 |

OTHER REFERENCES

Waterworks Handbook, Flinn, Westen and Bogert (1st ed.) (McGraw-Hill Book Co. Inc., New York), 1916, pages 690 to 691.